(12) United States Patent
Shim et al.

(10) Patent No.: US 7,650,043 B2
(45) Date of Patent: Jan. 19, 2010

(54) METHOD OF REDUCING BLOCKING ARTIFACTS FROM BLOCK-CODED DIGITAL IMAGES AND IMAGE REPRODUCING APPARATUS USING THE SAME

(75) Inventors: Woo-sung Shim, Suwon-si (KR); Eun-kyoung Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 657 days.

(21) Appl. No.: 10/901,150

(22) Filed: Jul. 29, 2004

(65) Prior Publication Data
US 2005/0036697 A1    Feb. 17, 2005

(30) Foreign Application Priority Data
Aug. 11, 2003    (KR) .................... 10-2003-0055357

(51) Int. Cl.
*G06K 9/40* (2006.01)
*H04N 11/04* (2006.01)

(52) U.S. Cl. .............. 382/268; 375/240.26; 375/240.21

(58) Field of Classification Search ................ 382/268, 382/266, 236; 375/240.29, 240.16, 240.24
See application file for complete search history.

(56) References Cited

U.S. PATENT DOCUMENTS

| | | | | |
|---|---|---|---|---|
| 5,949,917 | A * | 9/1999 | Kawasaka | 382/268 |
| 6,178,205 | B1 * | 1/2001 | Cheung et al. | 375/240.29 |
| 6,285,801 | B1 * | 9/2001 | Mancuso et al. | 382/268 |
| 6,535,643 | B1 | 3/2003 | Hong | |
| 6,539,060 | B1 | 3/2003 | Lee et al. | |
| 6,539,124 | B2 * | 3/2003 | Sethuraman et al. | 382/251 |
| 6,859,558 | B2 * | 2/2005 | Hong | 382/236 |
| 7,031,393 | B2 * | 4/2006 | Kondo et al. | 375/240.29 |
| 7,050,504 | B2 * | 5/2006 | Joch et al. | 375/240.26 |
| 7,227,901 | B2 * | 6/2007 | Joch et al. | 375/240.29 |
| 7,319,415 | B2 * | 1/2008 | Gomila | 341/50 |
| 2003/0053711 | A1 | 3/2003 | Kim | |
| 2003/0058944 | A1 * | 3/2003 | MacInnis et al. | 375/240.13 |

(Continued)

FOREIGN PATENT DOCUMENTS

AU    717480    2/2000

(Continued)

OTHER PUBLICATIONS

JVT, Draft Text of Final Draft International Standard for Advanced Video Coding; Mar. 2003.*

(Continued)

*Primary Examiner*—Vikkram Bali
*Assistant Examiner*—Andrae S Allison
(74) *Attorney, Agent, or Firm*—Staas & Halsey LLP (57) ABSTRACT

A method of removing blocking artifacts from block-coded digital images and an image reproducing apparatus using the same remove blocking artifacts from a block-coded digital image. The method includes adjusting filtering offsets on a block-by-block basis using motion vector (MV) and quantization parameter (QP) values; and performing deblocking filtering to remove the blocking artifacts from a decoded digital image using the adjusted filtering offsets. Accordingly, since the filtering offsets may be adaptively adjusted on a block-by-block basis to fit image characteristics, the blocking artifacts may be efficiently removed, thus, improving image quality.

20 Claims, 6 Drawing Sheets

U.S. PATENT DOCUMENTS

2003/0206664 A1* 11/2003 Gomila et al. .............. 382/268
2004/0179610 A1* 9/2004 Lu et al. ................. 375/240.25
2005/0117653 A1* 6/2005 Sankaran ............... 375/240.24

FOREIGN PATENT DOCUMENTS

| AU | 199912160 B2 | 2/2000 |
|----|--------------|--------|
| JP | 08-322041 | 12/1996 |
| KR | 2000-0031053 | 6/2000 |
| KR | 2001-0054731 | 7/2001 |
| KR | 2002-0014711 | 2/2002 |

OTHER PUBLICATIONS

List, P.; Joch, A.; Lainema, J.; Bjontegaard, G.; Karczewicz, M., "Adaptive deblocking filter," Circuits and Systems for Video Technology, IEEE Transactions on , vol. 13, No. 7, pp. 614-619, Jul. 2003.*
T. Wiegand, "Draft Text of Final Draft International Standard for Advanced Video Coding", Mar. 31, 2003, ISO/IEC JTC1/SC29/WG11 N5555, Pattaya, TH, pp. I-XVI, 1, XP001091555, p. 126, para. 8.7—p. 132, para. 8.7.3; p. 57, para. 7.4.3; p. 14, para. 6.4.1.
European Search Report (3 Pages).
Chinese Patent Office Action for corresponding Chinese Patent Application No. 2004100705899 dated Dec. 23, 2005.
Korean Office Action dated, Aug. 26, 2009, issued in corresponding Korean Patent Application No. 10-2003-0055357.

* cited by examiner

FIG. 5B
PREVIOUS FRAME

FIG. 5A
CURRENT FRAME

METHOD OF REDUCING BLOCKING ARTIFACTS FROM BLOCK-CODED DIGITAL IMAGES AND IMAGE REPRODUCING APPARATUS USING THE SAME

CROSS-REFERENCE TO RELATED APPLICATIONS

This application claims the priority of Korean Patent Application No. 2003-55357, filed on Aug. 11, 2003, in the Korean Intellectual Property Office, the disclosure of which is incorporated herein in its entirety by reference.

BACKGROUND OF THE INVENTION

1. Field of the Invention

The present invention relates to digital image processing, and more particularly, to a method of removing blocking artifacts from block-coded digital images, and an image reproducing apparatus using the same.

2. Description of the Related Art

Image compression is essential for efficiently processing digital images even when a plurality of memories are necessary. Commonly used standards for image compression are the International Standardization Organization (ISO) standards, such as Joint Photographic Experts Group (JPEG), Moving Picture Experts Group (MPEG)-1, MPEG-2, and MPEG-4, and the International Telecommunication Union (ITU) standards, such as H.261, H.26L, and H.264. Various functions, such as a virtual reality function and an authentication function, are constantly being added to these standards.

According to the image compression standards described above, an encoder for image compression divides a digital image into constant-sized blocks and compresses the divided digital image. That is, the encoder compresses the divided digital image by performing a discrete cosine transform (DCT) and a quantization on a block-by-block basis to obtain a block-coded digital image.

The block-coded digital image is reproduced by an image reproducing apparatus after a decoding process is performed. Since the digital image is processed on a block-by-block basis and information loss frequently occurs in the quantization process, a block boundary is visually distinguished in the reproduced digital image. This is called a blocking artifact.

To remove or reduce blocking artifacts, many methods have been suggested. Generally, the H.264 standard implements a method of removing blocking artifacts using deblocking filters in an encoder and a decoder and removing residual blocking artifacts using a post filter after the decoder.

Hereinafter, for the convenience of description, a block-coded method will be described with reference to the H.264 standard. However, the block-coded method is also commonly used in other image compression standards.

The deblocking filter to remove blocking artifacts in the H.264 standard is defined in a standard specification, according to Equation 1, to control a weight of the filter according to image characteristics.

$$indexA = \text{Clip3}(0, 51, qPav + \text{FilterOffsetA})$$

$$indexB = \text{Clip3}(0, 51, qPav + \text{FilterOffsetB}) \quad \text{Equation 1}$$

Here, FilterOffsetA and FilterOffsetB are filtering offsets, and indexa and indexB are determined according to FilterOffsetA and FilterOffsetB. The weight of the filter is obtained by referring to a table defined in the standard specification on the basis of indexa and indexB determined by Equation 1. The weight of the filter may be controlled by adjusting the filtering offsets (FilterOffsetA and FilterOffsetB) to fit the image characteristics. That is, the filtering offsets may be adjusted so that a strong filter is used for a flat image and a weak filter is used to display detailed portions of images beside the flat image.

According to the image compression standards, since the decoder operates in accordance with the encoder, filtering offsets used in the encoder are used as filtering offsets in the deblocking filter. Therefore, the performance of the deblocking filter in the decoder is dependent upon the filtering offsets used in the encoder.

Figure 1:
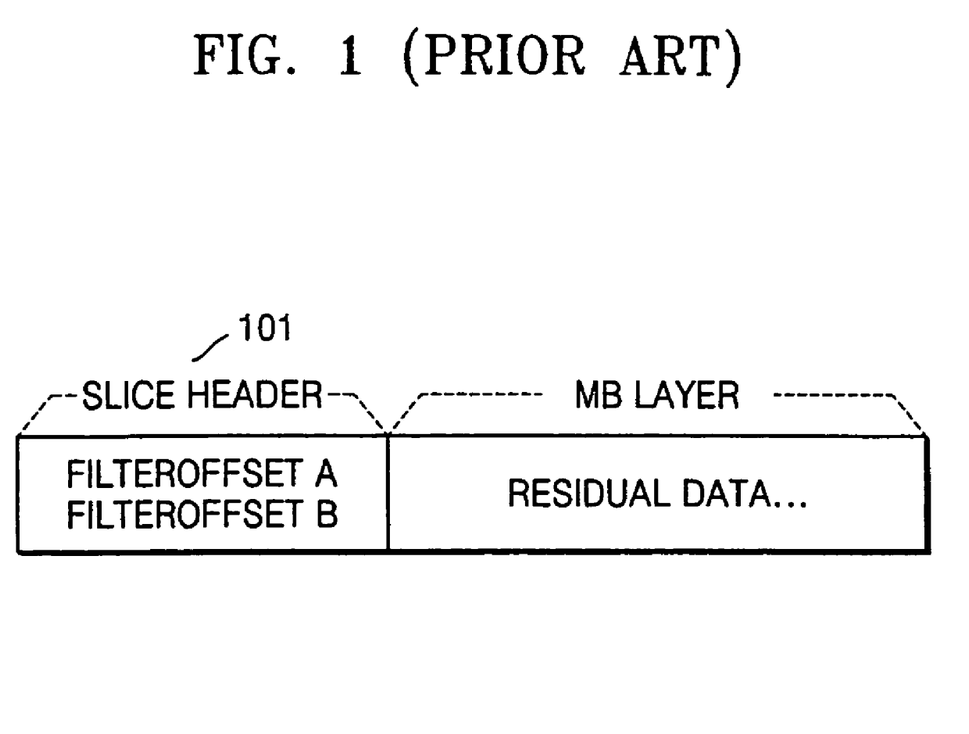
FIG. 1 is a reference diagram illustrating a deblocking filter of the H.264 standard.

FIG. 1 is a reference diagram illustrating the deblocking filter of the H.264 standard.

Referring to FIG. 1, the filtering offsets (FilterOffsetA and FilterOffsetB) are stored in a slice header 101 and transmitted to a decoder (not shown). That is, the filtering offsets used in an encoder (not shown) are also used in the decoder. Therefore, since the quality of a reproduced digital image may vary according to the filtering offsets used in the encoder, performance of an image reproducing apparatus is dependent on the filtering performance of the encoder.

Also, as shown in FIG. 1, the filtering offsets are defined on a slice-by-slice basis, each slice including a plurality of blocks. Accordingly, in a slice in which a same filtering offset is used, the same filter weight is applied. If image characteristics in the same slice are similar, the blocking artifacts may be efficiently removed. However, if various image characteristics exist in the same slice, since filtering offsets suitable for the various image characteristics cannot be applied, the blocking artifacts cannot be efficiently removed.

SUMMARY OF THE INVENTION

To solve the above and/or other problems, the present invention provides a method of removing blocking artifacts from a block-coded digital image and an image reproducing apparatus using the same.

According to an aspect of the present invention, a method removes blocking artifacts from a block-coded digital image, the method comprising: adjusting filtering offsets on a block-by-block basis using motion vector (MV) and quantization parameter (QP) values; and performing deblocking filtering to remove blocking artifacts from a decoded digital image using the adjusted filtering offsets.

Generally, adjusting the filtering offsets comprises: searching for positions of a block corresponding to a current block and a plurality of adjacent blocks in a previous frame using an MV value of the current block in a current frame; detecting the QP values of the corresponding block and the plurality of adjacent blocks on the basis of the found positions; obtaining a representative value of the detected QP values; normalizing the obtained representative value with a desired normalization offset level; and outputting the normalized value as a filtering offset.

Typically, searching for positions of a block corresponding to a current block and a plurality of adjacent blocks in a previous frame comprises: obtaining an address of the corresponding block in the previous frame using the MV value of the current block; and obtaining addresses of the adjacent blocks included in a predetermined range from the obtained address of the corresponding block.

Generally, normalizing the obtained representative value with a desired normalization offset level comprises normalizing an average value of the obtained QP values with the normalization offset level ranging between −6 and +6, and a normalization step size is adaptively designated so that image characteristics are reflected.

Typically, performing deblocking filtering to remove blocking artifacts from a decoded digital image using the adjusted filtering offsets comprises performing post filtering to remove the blocking artifacts using the filtering offsets of the block unit obtained by the MV and QP values of the block unit so that the image characteristics are reflected more effectively than in a method that utilizes offsets of the slice unit.

According to another aspect of the present invention, an image reproducing apparatus includes a decoder to decode a block-coded digital image, the apparatus comprising: an offset adjustment unit which adjusts filtering offsets on a block-by-block basis using motion vector (MV) and quantization parameter (QP) values; and a filtering processing unit which performs deblocking filtering to remove the blocking artifacts from a decoded digital image using the adjusted filtering offsets.

Generally, the offset adjustment unit comprises: a QP detector, which searches positions of a block corresponding to a current block and a plurality of adjacent blocks in a previous frame using the MV value of the current block intended to remove the blocking artifact in a current frame and detects the QP values of the corresponding block and the plurality of adjacent blocks on the basis of the found positions; a QP average unit, which obtains a representative value of the detected QP values; and a normalizer, which normalizes the obtained representative value with a desired normalization offset level and outputs the normalized value as a filtering offset.

Typically, the QP detector obtains an address of the corresponding block in the previous frame using the MV value of the current block; obtains addresses of the adjacent blocks included in a predetermined range from the obtained address of the corresponding block; and detects QP values of a corresponding block and the plurality of adjacent blocks on the basis of the obtained addresses in a QP memory storing QP values of the previous frame.

Generally, the normalizer normalizes an average value of the obtained QP values with the normalization offset level ranging between −6 and +6, and a normalization step size is adaptively designated so that image characteristics are reflected.

Typically, the filtering processing unit performs post filtering to remove the blocking artifacts using the filtering offsets of the block unit obtained by the MV and QP values of the block unit so that the image characteristics are reflected more effectively than in a filtering method that utilizes offsets of a slice unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
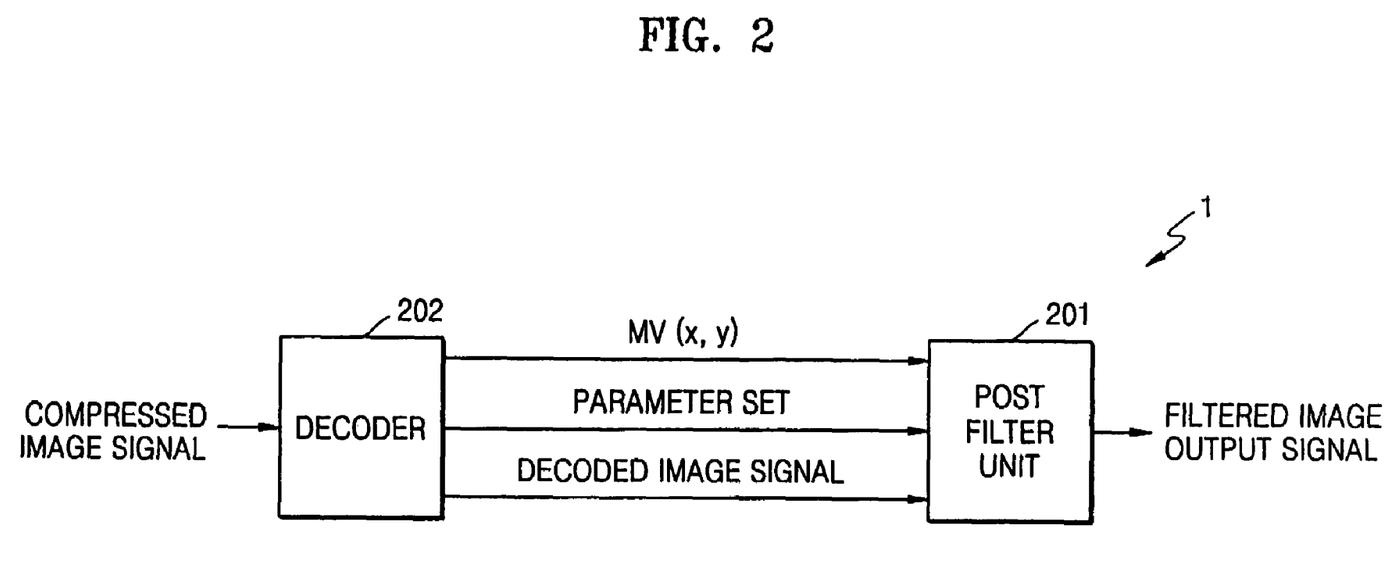
FIG. 2 is an outline diagram of an image reproducing apparatus to remove blocking artifacts according to an embodiment of the present invention.

FIG. 2 is an outline diagram of an image reproducing apparatus 1 to remove blocking artifacts according to an embodiment of the present invention. Referring to FIG. 2, the image reproducing apparatus 1 includes a decoder 202 and a post filter unit 201. The decoder 202 decodes compressed image information received from an encoder (not shown). That is, the decoder 202 decompresses the compressed image information by performing decoding processes, such as an inverse DCT, and an inverse quantization dependent on a DCT and a quantization used in the encoder. In general, a decoder may include a deblocking filter to remove the blocking artifacts described above. However, as described above, the performance of an image reproducing apparatus is still dependent on the performance of an encoder, and also, if various image characteristics exist in a same slice, the deblocking filter included in the decoder cannot efficiently remove the blocking artifacts.

Therefore, the image reproducing apparatus 1 according to the present invention includes the post filter unit 201 coupled to the deblocking filter included in the decoder 202. The post filter unit 201 performs filtering to remove the blocking artifacts using a decoded image signal and a filtering parameter received from the decoder 202. The filtering parameter may include a parameter set, which is defined in a standard specification, including a motion vector (MV), a quantization parameter (QP), and a reference index.

Generally, since the filtering parameter, according to an embodiment of the present invention, is applied on a block-by-block basis rather than on a slice-by-slice basis that is typically used in a conventional standard, even though various image characteristics exist in a same slice, the blocking artifacts may efficiently be removed.

Hereinafter, a configuration of the post filter unit 201 will be described in detail.

Figure 3:
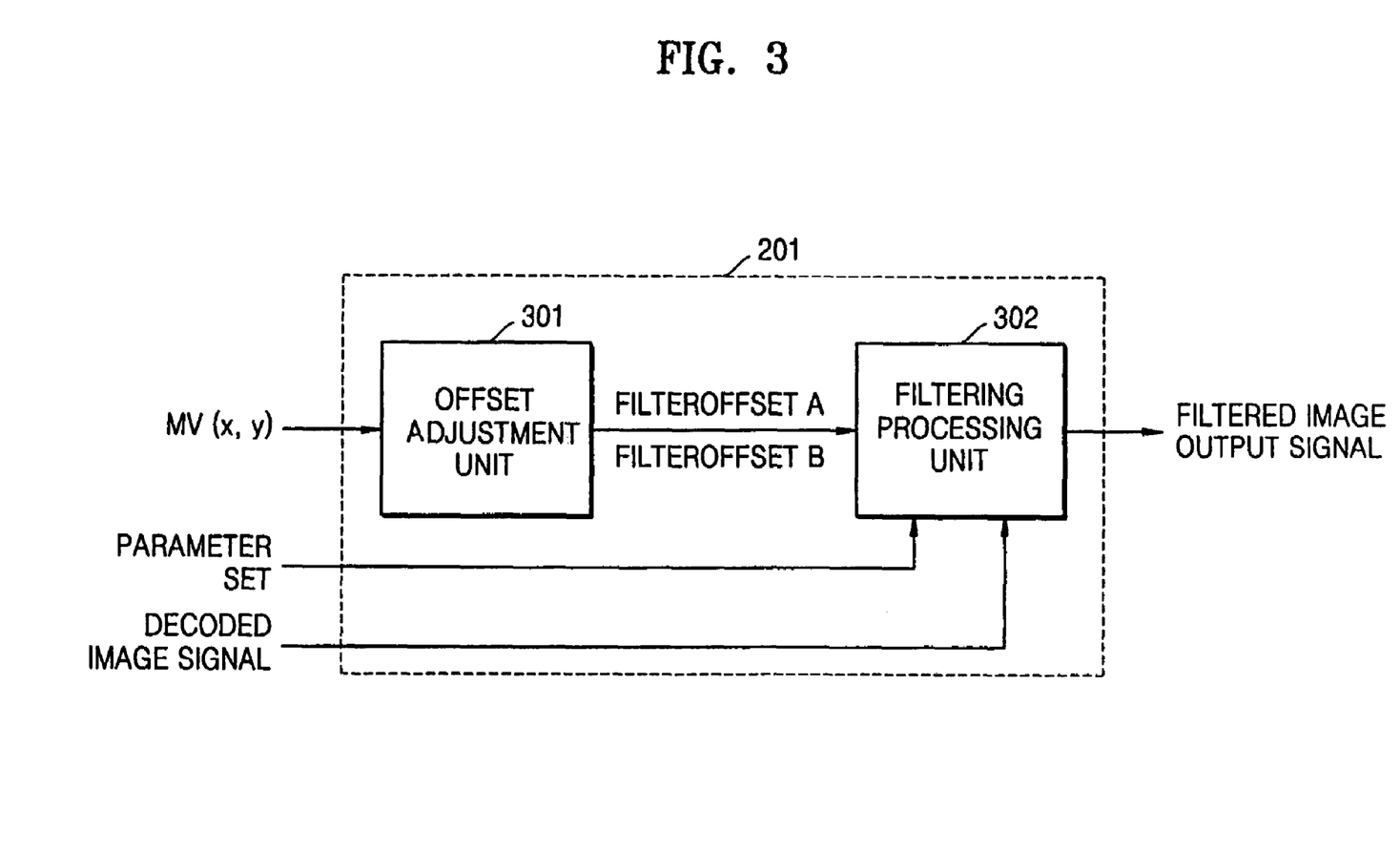
FIG. 3 is a block diagram of a post filter unit of FIG. 2.

FIG. 3 is a block diagram of the post filter unit 201 of FIG. 2. Referring to FIG. 3, the post filter unit 201 includes an offset adjustment unit 301 and a filtering processing unit 302. The offset adjustment unit 301 adjusts filtering offsets on a block-by-block basis using MV and QP values. That is, the offset adjustment unit 301 adjusts the filtering offsets (FilterOffsetA and FilterOffsetB) using the decoded image signal and MV(x,y), which is the MV value of a current block intended to remove the blocking artifact, and which is received from the decoder 202. A detailed process for obtaining the filtering offsets will be described below.

The filtering processing unit 302 performs deblocking filtering to remove the blocking artifacts on the decoded digital image. That is, the filtering processing unit 302 performs the post filtering to remove the blocking artifacts using the filtering offsets of the block unit obtained by the MV and QP values of the block unit so that the image characteristics are reflected more effectively than in a method that utilizes the offsets of the slice unit. A process of performing the deblocking filtering is followed by the standard specification of the image compression.

Figure 4:
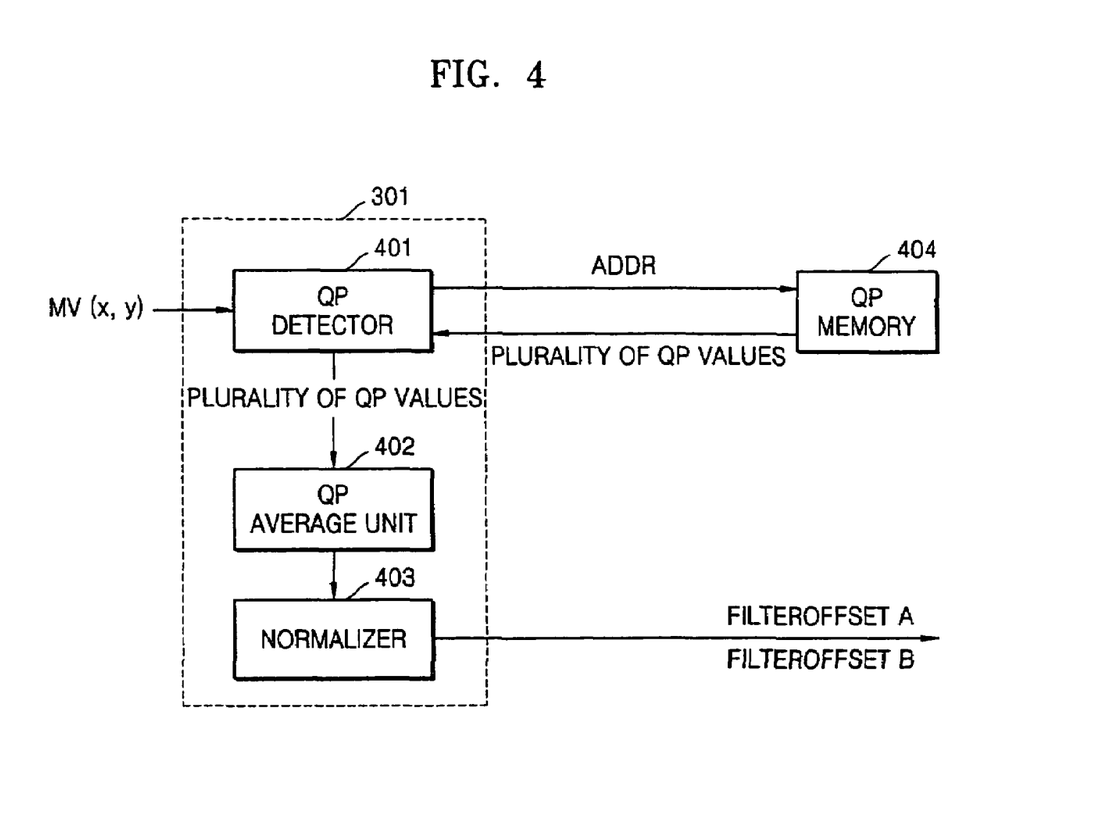
FIG. 4 is a block diagram of an offset adjustment unit of FIG. 3.

FIG. 4 is a block diagram of the offset adjustment unit 301 of FIG. 3. Referring to FIG. 4, the offset adjustment unit 301 includes a QP detector 401, a QP average unit 402, and a normalizer 403. The QP detector 401 searches for positions of a block corresponding to the current block and a plurality of adjacent blocks in a previous frame using an MV value of the current block intended to remove the blocking artifact in a current frame and detects QP values of the corresponding block and the plurality of adjacent blocks on the basis of the found positions.

In detail, first, the QP detector 401 obtains an address of the corresponding block in the previous block using the MV value of the current block. Next, the QP detector 401 obtains addresses Addr of the adjacent blocks included in a predetermined range from the obtained address of the corresponding block. The QP detector 401 detects the QP values of the corresponding block and the plurality of adjacent blocks on the basis of the obtained addresses Addr from a QP memory 404 storing QP values of the previous frame. A detailed method of detecting the QP values from the previous frame using the MV value will be described below.

The QP average unit 402 obtains an average value of the detected QP values.

The normalizer 403 normalizes the average value obtained by the QP average unit 402 with a desired normalization offset level and outputs the normalized value as the filtering offsets (FilterOffsetA and FilterOffsetB).

A method of removing the blocking artifacts of the digital image decoded on a block-by-block basis according to an embodiment of the present invention on the basis of the configurations described above will now be described.

Figure 5A:
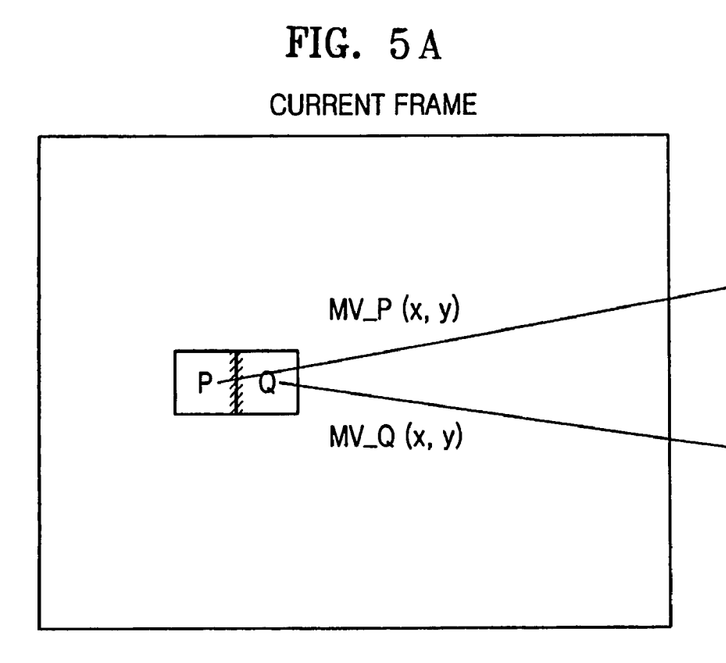
FIGS. 5A and 5B are reference diagrams illustrating a method of obtaining filtering offsets according to an embodiment of the present invention.
Figure 5B:
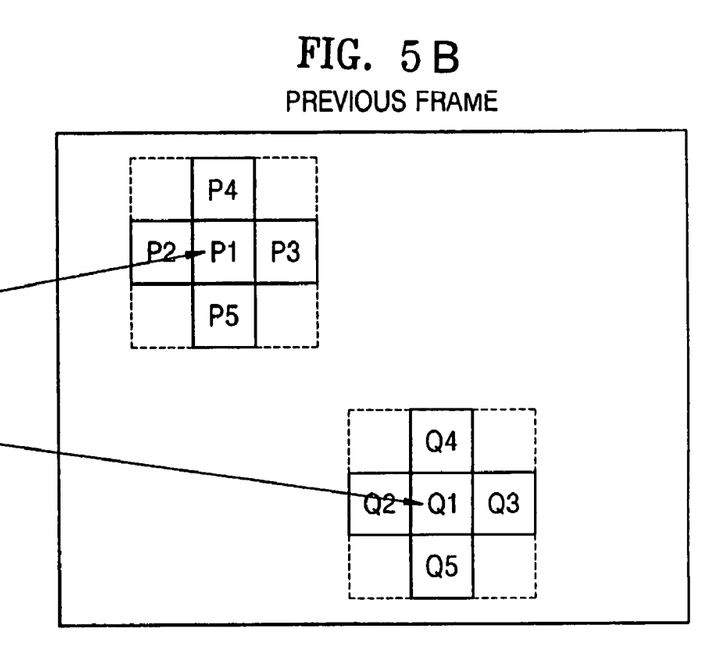

FIGS. 5A and 5B are reference diagrams illustrating a method of obtaining filtering offsets according to an embodiment of the present invention. FIG. 5A displays the current frame including blocks intended to remove the blocking artifact, and FIG. 5B displays the previous frame.

Referring to FIG. 5A, two current blocks P and Q, including a boundary where the blocking artifact has occurred, are displayed. Positions of blocks correspond to the current blocks P and Q in the previous frame using MV_P(x,y) and MV_Q(x,y), which are motion vectors of the current blocks P and Q, received from the decoder 202.

Referring to FIG. 5B, first, corresponding blocks P1 and Q1 in the previous frame are determined using MV_P(x,y) and MV_Q(x,y), which are the motion vectors of the current blocks P and Q. Next, positions of a plurality of blocks within a constant range from the blocks P1 and Q1 corresponding to the current blocks P and Q may be determined in the previous frame. For example, two blocks P2 and P3 adjacent to the horizontal direction of the corresponding block P1 or two blocks P4 and P5 adjacent to the vertical direction of the corresponding block P1 may be included. Also, all of blocks displayed by the dotted line may be included. The present embodiment presents a case wherein two blocks adjacent to the horizontal direction or the vertical direction are included.

Likewise, for the current block Q, after the corresponding block Q1 is determined in the previous frame using the motion vector MV_Q(x,y), positions of blocks Q2 through Q5 within a constant range from the corresponding block Q1 may be determined.

On the basis of addresses of the plurality of blocks in the previous frame, which has been determined using the motion vectors, QP values corresponding to the blocks are detected from the QP memory 404 storing the QP values of the blocks of the previous frame.

Examples of obtaining the filtering offsets using the detected QP values are displayed as Equations 2 and 3, provided that the QP values of the blocks are as shown in Table 1 below.

TABLE 1

| QP VALUES OF BLOCKS | |
|---|---|
| P1: Pre_P_QP1 | Q1: Pre_Q_QP1 |
| P2: Pre_P_QP2 | Q2: Pre_Q_QP2 |
| P3: Pre_P_QP3 | Q3: Pre_Q_QP3 |
| P4: Pre_P_QP4 | Q4: Pre_Q_QP4 |
| P5: Pre_P_QP5 | Q5: Pre_Q_QP5 |

$$FilterOffsetA = norm(6, -6, (Pre\_P\_QP1 + Pre\_P\_QP2 + Pre\_P\_QP3)/3)$$

$$FilterOffsetB = norm(6, -6, (Pre\_Q\_QP1 + Pre\_Q\_QP2 + Pre\_Q\_QP3)/3)$$ Equation 2: horizontal direction $$FilterOffsetA = norm(6, -6, (Pre\_P\_QP1 + Pre\_P\_QP4 + Pre\_P\_QP5)/3)$$

$$FilterOffsetB = norm(6, -6, (Pre\_Q\_QP1 + Pre\_Q\_QP4 + Pre\_Q\_QP5)/3)$$ Equation 3: vertical direction Equation 2 represents that, after average values of the QP values between blocks (P1, P2, P3 and Q1, Q2, Q3) adjacent to the horizontal direction are obtained, the filtering offsets are obtained by normalizing the average values. Here, 6 and −6 represent normalization offset levels, and other values may be applied to the normalization offset levels according to the image compression standard. FilterOffsetA represents the filtering offset of the current block P, and FilterOffsetB represents the filtering offset of the current block Q.

Equation 3 represents that after average values of the QP values between blocks (P1, P4, P5 and Q1, Q4, Q5) adjacent to the vertical direction are obtained, the filtering offsets are obtained by normalizing the average values. The other processes for obtaining the filtering offsets are the same as those described above.

In the present embodiment, an example of obtaining the offset twice for filtering to the horizontal direction and the vertical direction, respectively, is displayed. However, the filtering may be performed once without distinction between the horizontal direction and the vertical direction. That is, the deblocking filtering may be performed by setting a value, which has normalized an average value of QP values of predetermined blocks (for example, a portion displayed by the dotted line) adjacent to the block P, as FilterOffsetA and a value, which has normalized an average value of QP values of predetermined blocks (for example, a portion displayed by the dotted line) adjacent to the block Q, as FilterOffsetB. That is, a developer may determine how many blocks in the previous frame are included for obtaining the filtering offsets. A deblocking filtering processing process, after adjustment of the filtering offsets is performed, is followed by the image compression standard specification.

Hereinafter, a method of removing the blocking artifacts will now be described on the basis of the description described above.

Figure 6:
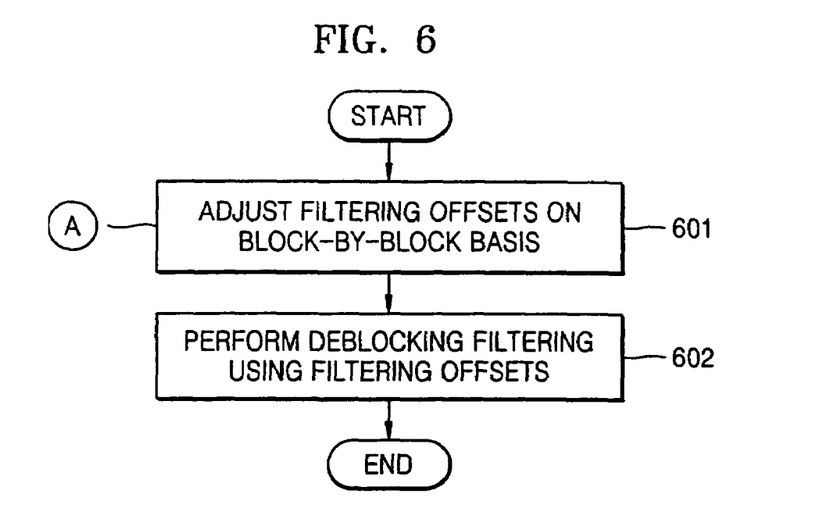
FIG. 6 is a flowchart of a method of removing blocking artifacts according to an embodiment of the present invention.

FIG. 6 is a flowchart of a method of removing blocking artifacts according to an embodiment of the present invention.

Referring to FIG. 6, to remove the blocking artifacts of a digital image decoded on a block-by-block basis, filtering offsets are adjusted on a block-by-block basis using MV and QP values in operation 601. Deblocking filtering removes the blocking artifacts of the decoded digital image using the adjusted filtering offsets in operation 602. That is, post filtering to remove the blocking artifacts using the filtering offsets of the block unit obtained by the MV and QP values of the block unit is performed so that image characteristics are reflected more effectively than in a method that utilizes offsets of the slice unit.

Hereinafter, the process A of adjusting the filtering offsets on a block-by-block basis will now be described in detail.

Figure 7:
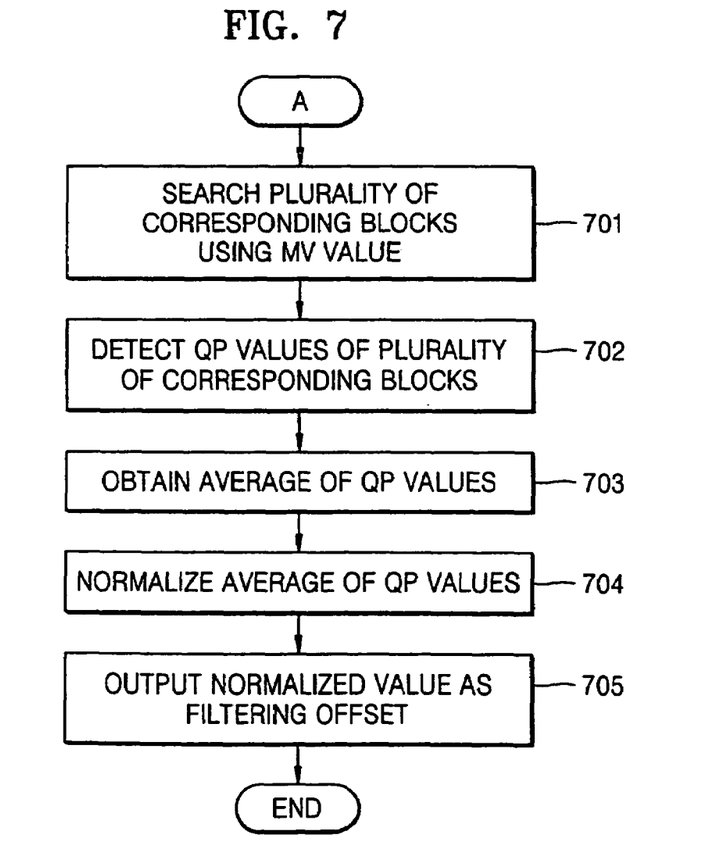
FIG. 7 is a flowchart of a method of adjusting filtering offsets on a block-by-block basis, which is illustrated in FIG. 6.

FIG. 7 is a flowchart of the method A of adjusting the filtering offsets on a block-by-block basis, which is illustrated in FIG. 6. Referring to FIG. 7, to adjust the filtering offsets on a block-by-block basis, first, positions of blocks corresponding to current blocks and a plurality of adjacent blocks are searched in a previous frame using MV values of the current blocks intended to remove the blocking artifact in a current frame in operation 701. That is, after addresses of the corresponding blocks in the previous frame are obtained using the MV values of the current blocks, addresses of the adjacent blocks included in a predetermined range are obtained from the obtained addresses of the corresponding blocks.

Next, on the basis of the found positions (addresses), QP values of the corresponding blocks and the plurality of adjacent blocks are detected from the QP memory 404 storing QP values of blocks of the previous frame in operation 702. An average value of the detected QP values is obtained in operation 703. The obtained average value is normalized with a desired normalization offset level in operation 704. The normalized value is output as a filtering offset in operation 705.

Generally, a normalization process of the H.264 standard includes that the average value of the QP values is normalized with the normalization offset level ranging between −6 and +6. At this time, the normalization offset level may be adjusted according to a selected image compression standard. Also, a step size for normalization may be determined linearly. However, the step size for normalization may be designated adaptively so that image characteristics are reflected.

As described above, according to an embodiment of the present invention, filtering offsets may be adjusted to fit image characteristics rather than applying filtering offsets of an encoder as defined in a standard specification. Therefore, since blocking artifacts may be removed to fit the image characteristics without being dependent on the performance of the encoder, image quality is improved subjectively and objectively.

Also, in a case wherein various image characteristics exist in a same slice, since blocking artifacts may be efficiently removed to fit the respective image characteristics by adjusting filtering offsets on a block-by-block basis rather than on a slice-by-slice basis and performing filtering, the image quality is improved.

Also, the method of the present invention may be embodied in a program code, which may be read by a computer, on a computer readable recording medium. The computer readable recording medium includes all kinds of recording apparatuses on which computer readable data are stored. The computer readable recording media includes storage media such as magnetic storage media (e.g., ROM's, floppy disks, hard disks, and the like), optically readable media (e.g., CD-ROMs, DVDs, and the like) and carrier waves (e.g., transmissions over the Internet). Also, the computer readable recording media may be transmitted to computer systems connected through a network, and it may store and execute a computer readable code in a distributed mode.

While the present invention has been particularly shown and described with reference to an embodiment of a case of following the H.264 standard thereof, it will be understood by those of ordinary skill in the art that various changes in form and details may be made therein without departing from the spirit and scope of the present invention as defined by the appended claims. Generally, according to an applied image compression standard, the scope of the invention will be construed so that various changes in form and details may be made therein without departing from the spirit and scope of the present invention as defined by the following claims and not being limited to the embodiment described with respect to the H.264 standard. Thus, although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of removing blocking artifacts from a block-coded digital image, the method comprising:

adjusting filtering offsets on a block-by-block basis using motion vector (MV) and quantization parameter (QP) values, a block being a subdivision of a slice; and performing deblocking filtering to remove the blocking artifacts from a decoded digital image using the adjusted filtering offsets, wherein the performing of the deblocking filtering to remove the blocking artifacts from the decoded digital image using the adjusted filtering offsets comprises performing post filtering to remove the blocking artifacts using the filtering offsets of a block unit obtained by the MV and QP values of the block unit, wherein the adjusting of the filtering offsets on the block-by-block basis using motion vector (MV) and quantization parameter (QP) values comprises adjusting filtering offsets based on QP value of a corresponding block, which is determined using MV value of the current block, in a previous frame.

2. The method of claim 1, wherein the adjusting of the filtering offsets on the block-by-block basis using motion vector (MV) and quantization parameter (QP) values comprises:

searching for positions of a block corresponding to a current block and a plurality of adjacent blocks in a previous frame using an MV value of the current block in a current frame;

detecting QP values of the corresponding block and the plurality of adjacent blocks on the basis of the found positions;

obtaining a representative value of the detected QP values;

normalizing the obtained representative value with a desired normalization offset level; and outputting the normalized value as a filtering offset.

3. The method of claim 2, wherein the searching for positions of the block corresponding to the current block and the plurality of adjacent blocks in the previous frame using the MV value of the current block in the current frame comprises:

obtaining an address of the corresponding block in the previous frame using the MV value of the current block; and obtaining addresses of the adjacent blocks included in a predetermined range from the obtained address of the corresponding block.

4. The method of claim 2, wherein the normalizing of the obtained representative value with the desired normalization offset level comprises normalizing an average value of the obtained QP values with the normalization offset level ranging between −6 and +6 and adaptively designating a normalization step size so that image characteristics are reflected.

5. An image reproducing apparatus including a decoder decoding a block-coded digital image, the apparatus comprising:
an offset adjustment unit which adjusts filtering offsets on a block-by-block basis using motion vector (MV) and quantization parameter (QP) values; and
a filtering processing unit which performs deblocking filtering to remove the blocking artifacts from a decoded digital image using the adjusted filtering offsets,
wherein the filtering processing unit performs post filtering to remove the blocking artifacts using the filtering offsets of the block unit obtained by the MV and QP values of the block unit,
wherein the offset adjustment unit adjusts filtering offsets based on QP value of a corresponding block, which is determined using MV value of the current block, in a previous frame.

6. The apparatus of claim 5, wherein the offset adjustment unit comprises:
a QP detector which searches for positions of a block corresponding to a current block and a plurality of adjacent blocks in a previous frame using the MV value of the current block intended to remove the blocking artifact in a current frame and detects the QP values of the corresponding block and the plurality of adjacent blocks on the basis of the found positions;
a QP average unit which obtains a representative value of the detected QP values; and
a normalizer which normalizes the obtained representative value with a desired normalization offset level and outputs the normalized value as a filtering offset.

7. The apparatus of claim 6, wherein the QP detector:
obtains an address of the corresponding block in the previous frame using the MV value of the current block;
obtains addresses of the adjacent blocks included in a predetermined range from the obtained address of the corresponding block; and
detects QP values of a corresponding block and the plurality of adjacent blocks on the basis of the obtained addresses in a QP memory storing QP values of the previous frame.

8. The apparatus of claim 6, wherein the normalizer normalizes an average value of the obtained QP values with the normalization offset level ranging between −6 and +6 and adaptively designates a normalization step size so that image characteristics are reflected.

9. A non-transitory computer-readable recording medium having computer-readable instructions to remove blocking artifacts from a block-coded digital image, the computer-readable instructions comprising:
adjusting filtering offsets on a block-by-block basis using motion vector (MV) and quantization parameter (QP) values; and
performing deblocking filtering to remove the blocking artifacts from a decoded digital image using the adjusted filtering offsets, and
wherein the performing deblocking filtering to remove the blocking artifacts from the decoded digital image using the adjusted filtering offsets comprises performing post filtering to remove the blocking artifacts using the filtering offsets of a block unit obtained by the MV and QP values of the block unit,
wherein the adjusting of the filtering offsets on the block-by-block basis using motion vector (MV) and quantization parameter (QP) values comprises adjusting filtering offsets based on QP value of a corresponding block, which is determined using MV value of the current block, in a previous frame.

10. The computer-readable recording medium of claim 9, wherein the adjusting of the filtering offsets on the block-by-block basis using motion vector (MV) and quantization parameter (QP) values comprises:
searching for positions of a block corresponding to a current block and a plurality of adjacent blocks in a previous frame using an MV value of the current block in a current frame;
detecting QP values of the corresponding block and the plurality of adjacent blocks on the basis of the found positions;
obtaining a representative value of the detected QP values;
normalizing the obtained representative value with a desired normalization offset level; and
outputting the normalized value as a filtering offset.

11. The computer-readable recording medium of claim 10, wherein the searching for positions of the block corresponding to the current block and the plurality of adjacent blocks in the previous frame using the MV value of the current block in the current frame comprises:
obtaining an address of the corresponding block in the previous frame using the MV value of the current block; and
obtaining addresses of the adjacent blocks included in a predetermined range from the obtained address of the corresponding block.

12. The computer-readable recording medium of claim 10, wherein the normalizing of the obtained representative value with the desired normalization offset level comprises normalizing an average value of the obtained QP values with the normalization offset level ranging between −6 and +6, and adaptively designating a normalization step size so that image characteristics are reflected.

13. A method of removing blocking artifacts from a block-coded digital image, wherein filtering offsets have been pre-adjusted on a block-by-block basis using motion vector (MV) and quantization parameter (QP) values, a block being a subdivision of a slice, the method comprising:
performing deblocking filtering to remove the blocking artifacts from a decoded digital image using the pre-adjusted filtering offsets,
wherein the performing of deblocking filtering to remove the blocking artifacts from the decoded digital image using the pre-adjusted filtering offsets comprises performing post filtering to remove the blocking artifacts using the pre-adjusted filtering offsets of a block unit obtained by the MV and QP values of the block unit,
wherein the pre-adjusted filtering offsets of a block unit is obtained by adjusting filtering offsets based on QP value of a corresponding block, which is determined using MV value of a current block, in a previous frame.

14. The method of claim 13, wherein the pre-adjusted filtering offsets are determined by:
searching for positions of a block corresponding to a current block and a plurality of adjacent blocks in a previous frame using an MV value of the current block in a current frame;

detecting QP values of the corresponding block and the plurality of adjacent blocks on the basis of the found positions;

obtaining a representative value of the detected QP values;

normalizing the obtained representative value with a desired normalization offset level; and outputting the normalized value as a filtering offset.

15. The method of claim 14, wherein the searching for positions of the block corresponding to the current block and the plurality of adjacent blocks in the previous frame using the MV value of the current block in the current frame comprises:

obtaining an address of the corresponding block in the previous frame using the MV value of the current block; and obtaining addresses of the adjacent blocks included in a predetermined range from the obtained address of the corresponding block.

16. The method of claim 14, wherein the normalizing of the obtained representative value with the desired normalization offset level comprises normalizing the average value of the obtained QP values with the normalization offset level ranging between −6 and +6 and adaptively designating a normalization step size so that image characteristics are reflected.

17. A non-transitory computer-readable storage medium having computer-readable instructions to remove blocking artifacts from a block-coded digital image, wherein filtering offsets have been pre-adjusted on a block-by-block basis using motion vector (MV) and quantization parameter (QP) values, the computer-readable instructions comprising:

performing deblocking filtering to remove the blocking artifacts from a decoded digital image using the pre-adjusted filtering offsets, and wherein the performing of the deblocking filtering to remove the blocking artifacts from the decoded digital image using the pre-adjusted filtering offsets comprises performing post filtering to remove the blocking artifacts using the pre-adjusted filtering offsets of a block unit obtained by the MV and QP values of the block unit, wherein the pre-adjusted filtering offsets of a block unit is obtained by adjusting filtering offsets based on QP value of a corresponding block, which is determined using MV value of a current block, in a previous frame.

18. The computer-readable recording medium of claim 17, wherein the pre-adjusted filtering offsets are determined by:

searching for positions of a block corresponding to a current block and a plurality of adjacent blocks in a previous frame using an MV value of the current block in a current frame;

detecting QP values of the corresponding block and the plurality of adjacent blocks on the basis of the found positions;

obtaining a representative value of the detected QP values;

normalizing the obtained representative value with a desired normalization offset level; and outputting the normalized value as a filtering offset.

19. The computer-readable recording medium of claim 18, wherein the searching for positions of the block corresponding to the current block and the plurality of adjacent blocks in the previous frame using the MV value of the current block in the current frame comprises:

obtaining an address of the corresponding block in the previous frame using the MV value of the current block; and obtaining addresses of the adjacent blocks included in a predetermined range from the obtained address of the corresponding block.

20. The computer-readable recording medium of claim 18, wherein the normalizing of the obtained representative value with the desired normalization offset level comprises normalizing an average value of the obtained QP values with the normalization offset level ranging between −6 and +6 and adaptively designating a normalization step size so that image characteristics are reflected.

* * * * *

UNITED STATES PATENT AND TRADEMARK OFFICE
CERTIFICATE OF CORRECTION

PATENT NO. : 7,650,043 B2  Page 1 of 1
APPLICATION NO. : 10/901150
DATED : January 19, 2010
INVENTOR(S) : Shim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1106 days.

Signed and Sealed this

Twenty-eighth Day of December, 2010

David J. Kappos
*Director of the United States Patent and Trademark Office*